Aug. 2, 1966 C. H. COKER 3,264,636

ELECTRONIC SIGNAL CONVERTER

Filed May 19, 1961 5 Sheets-Sheet 1

INVENTOR.
CECIL H. COKER
BY
Christie, Parker & Hale
ATTORNEYS.

Aug. 2, 1966 C. H. COKER 3,264,636

ELECTRONIC SIGNAL CONVERTER

Filed May 19, 1961 5 Sheets-Sheet 2

INVENTOR.
CECIL H. COKER

BY Christie Parker & Hale

ATTORNEYS.

ELECTRONIC SIGNAL CONVERTER

Filed May 19, 1961 5 Sheets-Sheet 3

INVENTOR.
CECIL H. COKER

BY Christie, Parker & Hale
ATTORNEYS.

Aug. 2, 1966 C. H. COKER 3,264,636

ELECTRONIC SIGNAL CONVERTER

Filed May 19, 1961 5 Sheets-Sheet 4

INVENTOR.
CECIL H. COKER

BY Christie, Parker & Hale

ATTORNEYS.

Aug. 2, 1966 C. H. COKER 3,264,636

ELECTRONIC SIGNAL CONVERTER

Filed May 19, 1961 5 Sheets-Sheet 5

INVENTOR.
CECIL H. COKER

BY Christie, Parker & Hale
ATTORNEYS.

3,264,636
Patented August 2, 1966

3,264,636
ELECTRONIC SIGNAL CONVERTER

Cecil H. Coker, Madison, Wis., assignor to Wisconsin Alumni Research Foundation, Madison, Wis., a corporation of Wisconsin Filed May 19, 1961, Ser. No. 111,351
18 Claims. (Cl. 340—347)

This invention relates to electronic circuits and more particularly to circuits encoding and decoding electronic signals.

Electronic signal converting devices are generally known and have a variety of uses. For example, pulse code modulation (PCM) techniques have been used in communication systems to take advantage of the favorable signal to noise characteristics obtained therefrom. PCM techniques require signal converting devices. Modern control systems are utilizing telemetering techniques for signal transmission to and from digital computers. These systems also require electronic signal converters.

However, signal converting devices are in general complex, unreliable, expensive and large in size. As a result, PCM techniques have been slow coming into use in communication systems. Also, other signal converting devices are needed for control systems which do not have these disadvantages.

Electronic signal converters referred to herein may be classified as analog to digital signal converters, called encoders, and digital to analog signal converters, called decoders. A number of types of electronic signal converters are presently known; see, for example, chapter 11 of the book entitled Digital Computer Components & Circuits, written by R. K. Richards, and published by Van Nostrand Company, Inc., in 1957.

Saturable magnetic cores have been used in encoders. For example, a magnetic core with a substantially square hysteresis loop may be cleared or saturated to a reference level. Then an amount of flux proportional to the unknown analog signal which is to be converted is magnetically stored in the core. The core is then repeatedly pulsed with a magnetic field which tends to force the core back to the reference level of flux. If the pulses have constant time duration and amplitude, the number of pulses required to saturate the core at the reference level is proportional to the unknown signal. An example of this method of encoding is shown in the patent issued to Goodell et al., No. 2,808,578. The disadvantage of this arrangement is that it does not provide direct read-out and a counter is needed to count the pulses required to saturate the magnetic core in order to determine the amount of flux stored in the core.

The present invention provides an electronic signal converter which overcomes the above disadvantages and provides a small, reliable, and inexpensive electronic signal converter.

Briefly, the electronic signal converter of the present invention includes a signal integrating element having at least one reference state. A first means is connected to the integrating element and has a cycle of operation wherein the signals in the integrating element are forced towards the reference state. The first means goes through this cycle a plurality of times for each signal to be converted. A second means is connected to the integrating element and is responsive to the reference state of the integrating element within a pre-selected time interval of the beginning of each cycle for forcing the signals therein away from the reference state. The electronic signal converter may be operated as an encoder by storing an analog signal in the integrating element and generating a predetermined digital signal during each cycle if the signal reaches the reference state within the pre-selected time interval. The electronic signal converter may be operated as a decoder by operating the first and second means corresponding to the digital signals to be converted and observing the final amplitude of the signal stored in the integrating element.

A specific embodiment of the present invention is an encoder circuit. The encoder circuit comprises a saturable magnetic core integrating element which has a plurality of primary windings magnetically coupled thereto. Associated with each primary winding is a feedback winding. Switching circuits are connected to each primary winding and the associated feedback winding such that positive feedback is provided from each primary winding through the core to the associated feedback winding. This feedback controls current conduction in the switching circuits. A timing circuit is also provided for selectively biasing the switching circuits into conduction for clearing the magnetic core to a reference level of flux and then reading in an unknown analog signal to be converted. The timing circuits also provide bias signals to the switching circuits which allow the switching circuits to be selectively switched into and out of conduction due to feedback and thereby cause a preselected amount of flux to be subtracted from the flux stored in the core and then restore another amount of flux back in the core. By selecting the correct turns ratios of the primary windings and providing the correct timing pulses to the switching circuits, the wave form in the core directly represents the digits of the resultant digital number. In one embodiment of the invention, digital signals are in the Gray code.

These and other aspects of the present invention may be more fully understood in the following description of the figures of which:

Figures 3, 3A:
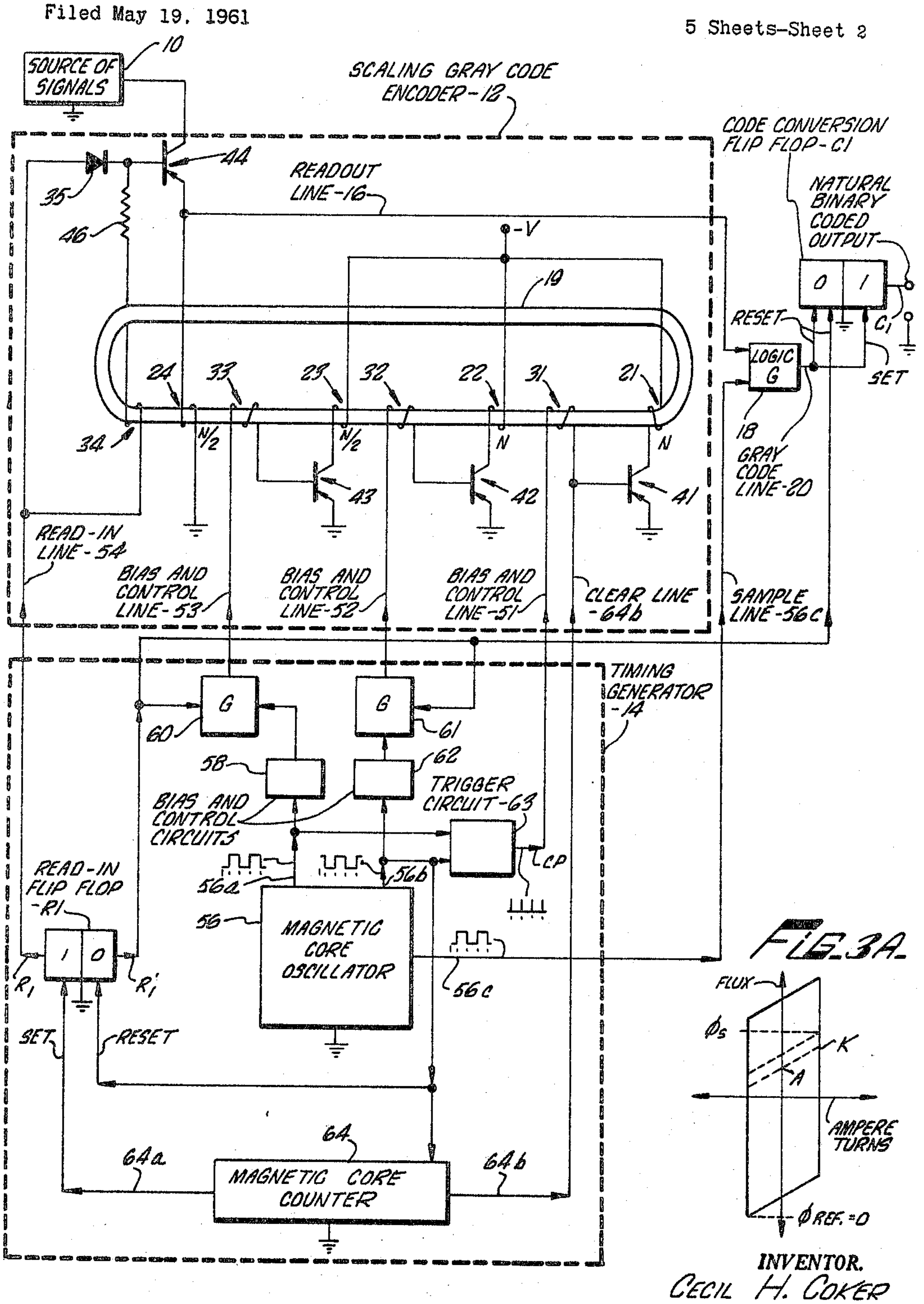
FIGURE 3 is a schematic block diagram of a binary encoder embodying the present invention.
FIGURE 3A illustrates the shape of the hysteresis loop used in the cores of the binary encoder of FIG. 3.
Figure 4A:
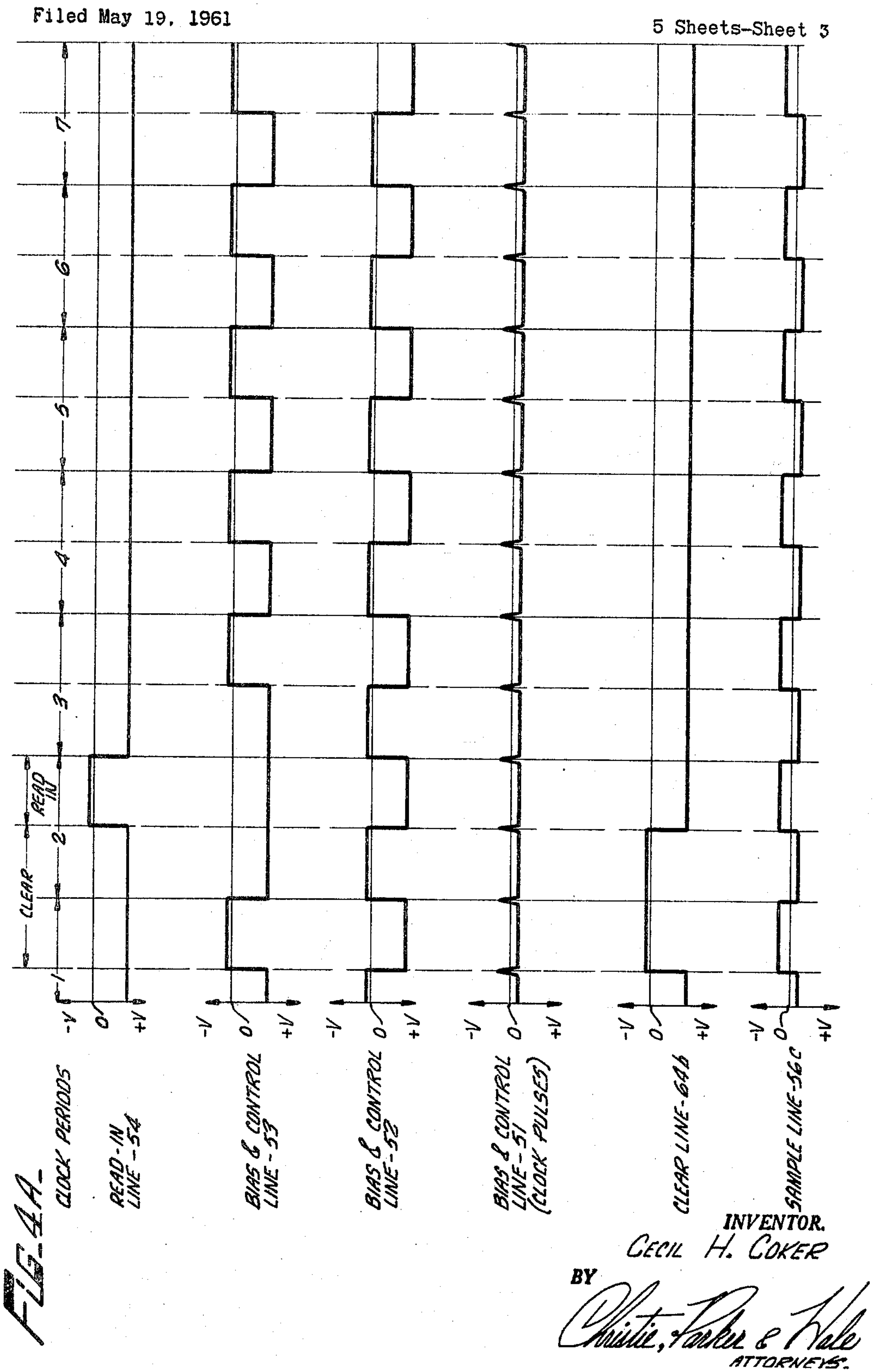
Figure 4B:
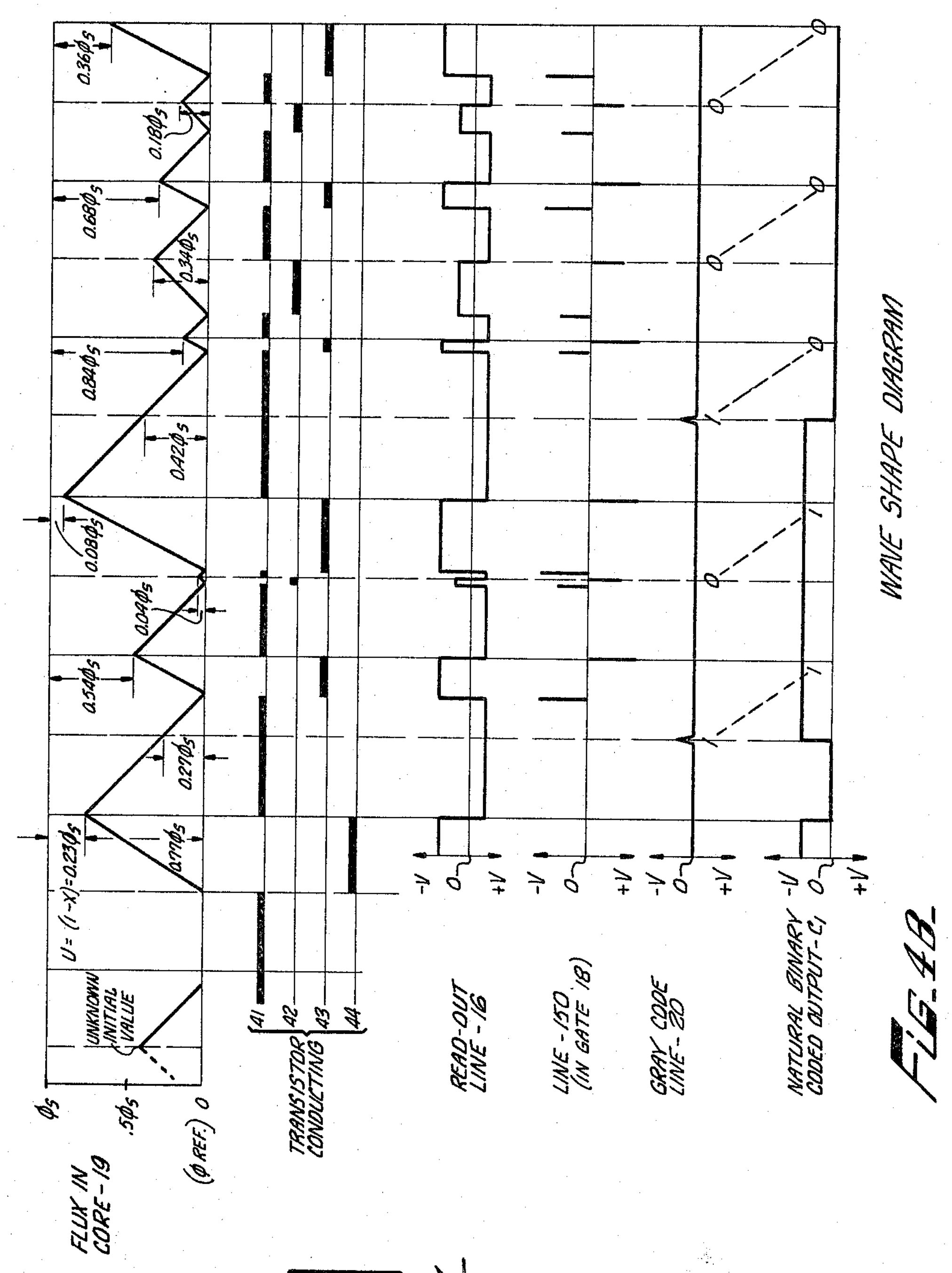
Figure 4:
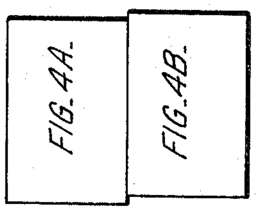
Figures 5, 6:
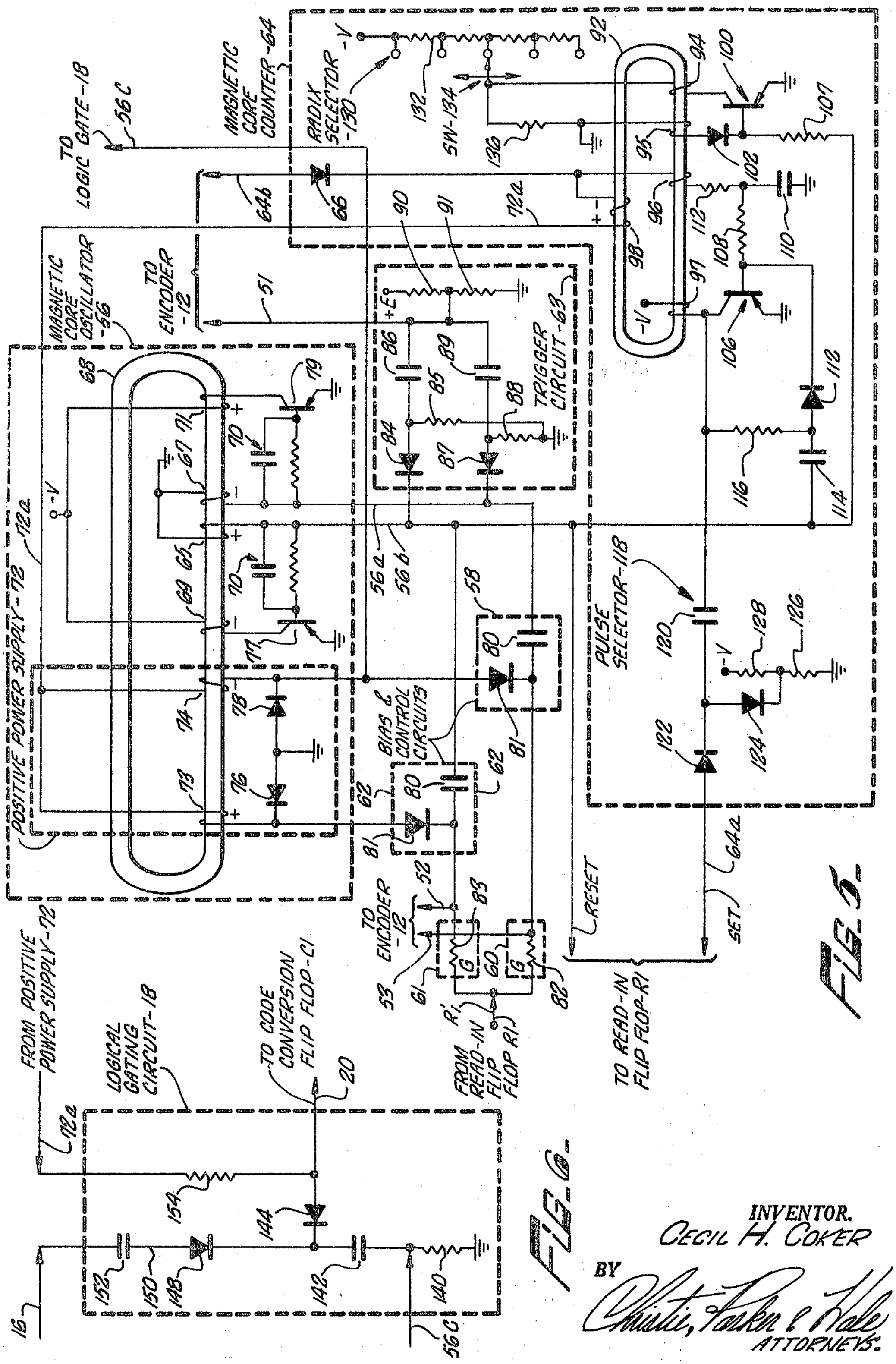

FIGURE 4 and its constituents comprising FIGS. 4A and 4B show the wave shape diagram of the signals at designated points in the binary encoder of FIG. 3;

FIGURE 5 is a schematic diagram of a magnetic core oscillator, and a magnetic core counter along with the gating and wave shaping circuits for use in the binary encoder of FIG. 3; and FIGURE 6 is a schematic diagram of a logical gating circuit for use in the binary encoder of FIG. 3.

Before explaining the signal converter shown in FIG. 1, examples will be given of rules for converting analog signals to Gray binary coded signals, hereinafter referred to as Gray coded signals, and natural binary coded signals. The Gray code is a unit distance code in which the characters representing two successive numbers differ by only one symbol; see, for example, chaper 3, pages 10 to 16 of the book entitled Notes on Analog-Digital Conversion Techniques written by A. K. Susskind and published jointly by the Massachusetts Institute of Technology and John Wiley and Sons, Inc. in 1957. This is in contrast to the natural binary code, hereinafter referred to as the natural code, as shown in chapter 3, page 2 of the above-reference book Notes on Analog-Digital Conversion Techniques where more than one character may change at a time.

Table I shows one set of rules for converting an analog signal to digital signals. It should be understood, however, that these rules are given by way of example only and that many other rules may be implemented using the present invention. The rules of Table I are for converting a signal ($x$) which is a fraction of a standard signal ($s$) to digital signals coded in the Gray code and also digital signals coded in natural code each having $n$ digits.

TABLE I

*Step* — *Rule*

1
A. Subtract one-half of the standard signal ($s/2$) from the signal to be converted ($x$).
B. If the remainder obtained in step 1–A is greater than zero, develop:
  1. A Gray coded digit "1."
  2. A natural coded digit "1."
C. If the remainder obtained in step 1–A is equal to or less than zero, develop:
  1. A Gray coded digit "0."
  2. A natural coded digit "0."

2
A. Subtract (one-half)$^2$ of the standard signal ($s/4$) from the absolute value of the remainder obtained in step 1–A.
B. If the remainder obtained in step 2–A is greater than zero, develop:
  1. A Gray coded digit "0."
  2. A natural coded digit the same as the natural coded digit deevloped in step 1.
C. If the remainder obtained in step 2–A is equal to or less than zero, develop:
  1. A Gray coded digit "1."
  2. A natural coded digit the opposite of the natural coded digit developed in steps 1–B or 1.

⋮

$n$
A. Subtract (one-half)$^n$ of the standard signal $[(\frac{1}{2})^n s]$ from the absolute value of the remainder obtained in the last step $$[(\text{Step }((n-1))-\text{A})]$$

B. If the remainder obtained in step $n$–A is greater than zero, develop:
  1. A Gray coded digit "0."
  2. A natural coded digit the same as the natural coded digit developed in the previous step [Step ($n$–1)].
C. If the remainder obtained in step $n$–A is equal to or less than zero, develop:
  1. A Gray coded digit "1."
  2. A natural coded digit opposite to the natural coded digit developed in the previous step [Step ($n$–1)].

As an example, assume that a signal represented by the decimal number 0.77 is to be converted according to the rules of Table I. Also assume the standard signal is a decimal one ($s=1$) and that the resultant signal is to have nine digits ($n=9$). Following the rules outlined in Table I, the conversion is as follows:

TABLE II

| Step | Example Calculation for $x=0.77$ and $s=1$ | Complement of Gray Code | Natural Code |
|---|---|---|---|
| 1 | 0.77 −0.5 = 0.27 >0 | 1 | 1 |
| 2 | 0.27 −0.25 = 0.02 >0 | 0 | 1 |
| 3 | 0.02 −0.125 =−0.105 ≤0 | 1 | 0 |
| 4 | 0.105 −0.0625 = 0.0425 >0 | 0 | 0 |
| 5 | 0.0425 −0.03125 = 0.01125 >0 | 0 | 0 |
| 6 | 0.01125 −0.015625 =−0.004375 ≤0 | 1 | 1 |
| 7 | 0.004375 −0.0078125 =−0.0034375 ≤0 | 1 | 0 |
| 8 | 0.0034375 −0.00390625 =−0.00046875 ≤0 | 1 | 1 |
| 9 | 0.00046875−0.001953125=−0.001484375≤0 | 1 | 0 |

It should be understood that the above rules for conversion are actually a close approximation to the true binary representation and that the error reduces as the number of digits in the resultant signal is increased.

Referring again to Table I, step 1 is the step during which the first digit of the converted digital number is developed, and it will be noted that the rules are different from steps 2 through $n$. This poses a problem when electronic circuitry is used for implementing the steps described in Table I. However, this problem can be corrected without special hardware by modifying these rules slightly. This may be done as follows: If the signal ($x$) being converted is less than 1, subtract it from 1, the standard signal ($s$). The remainder ($u$, where $u=1-x$) obtained from this subtraction will hereinafter be referred to as the corrected signal to be converted. One-half the value of the standard signal ($\frac{1}{2}s$) may then be subtracted from the corrected signal to be converted $[u-\frac{1}{2}s=-(x-\frac{1}{2}s)]$ with the result that the sign of the remainder in the first step is the opposite of what it would have been otherwise, or pre-inverted. This allows the special step 1 of Table I to be eliminated and the rules for encoding in Table I simplified as shown in the following Table III.

TABLE III

*Step* — *Rule*

0
Subtract the number to be converted ($x$) from the standard signal ($s$), and call this the remainder or corrected signal to be converted ($u=s-x$).

1
A. Subtract one-half of the standard signal ($\frac{1}{2}s$) from the remainder in the last step of operation.
B. If the remainder obtained in step 1–A is greater than zero, develop:
  1. A Gray coded digit "0"
  2. A natural coded digit the same as the natural coded digit developed in the previous step. If this is the first digit, assume the digit in the previous digit was a digit "0."
C. If the remainder obtained in step 1–A is equal to or less than zero, develop:
  1. A Gray coded digit "1"
  2. A natural coded digit the opposite of the natural coded digit developed in the previous step. If this is the first digit, assume the last natural coded digit was a "0."

2
Double the absolute value of the remainder obtained in step 1–A to form the remainder for 3
step 1.
Repeat steps 1, 2 n–1 times.

The differences between the rules of Table I and Table III are important for ease of mechanization, however, the result is the same. One difference in the rules which should be noted is that in Table III the remainder obtained in step 1–A is doubled in the next step rather than reducing the value of the standard signal by a factor of one-half. The rules laid out in Table III are applied to a signal represented by the decimal number 0.77 in the following Table IV.

TABLE IV

| Step | Example for $x=0.77$ and $s=1$ | Complement of Gray Code | Natural Code |
|---|---|---|---|
| | $u=1-0.77=0.23$ | | |
| 1 | $0.23-0.5=-0.27\leq 0$ | 1 | 1 |
| 2 | $0.54-0.5=\ 0.04\geq 0$ | 0 | 1 |
| 3 | $0.08-0.5=-0.42\leq 0$ | 1 | 0 |
| 4 | $0.84-0.5=\ 0.34\geq 0$ | 0 | 0 |
| 5 | $0.68-0.5=\ 0.18>0$ | 0 | 0 |
| 6 | $0.36-0.5=-0.14\leq 0$ | 1 | 1 |
| 7 | $0.28-0.5=-0.22\leq 0$ | 1 | 0 |
| 8 | $0.44-0.5=-0.06\leq 0$ | 1 | 1 |
| 9 | $0.12-0.5=-0.38\leq 0$ | 1 | 0 |

The rules of Tables I and III and signal converters to be explained herein utilize the steps of signal comparison and subtraction, signal scaling and signal mapping. For example, in Table IV the decimal number .23 represents a signal which is a fraction of and in the same scale as the standard signal or number 1. The decimal number or signal .23 is compared with the standard and one-half the standard, .5, subtracted from the number. The magnitude of the result of the subtraction .27 is then doubled and the result put in the same scale as the standard 1 for the next step of subtracting. To be explained in the following discussion, the embodiment of the invention illustrated herein always maps the result back into the same signal region.

Figure 1:
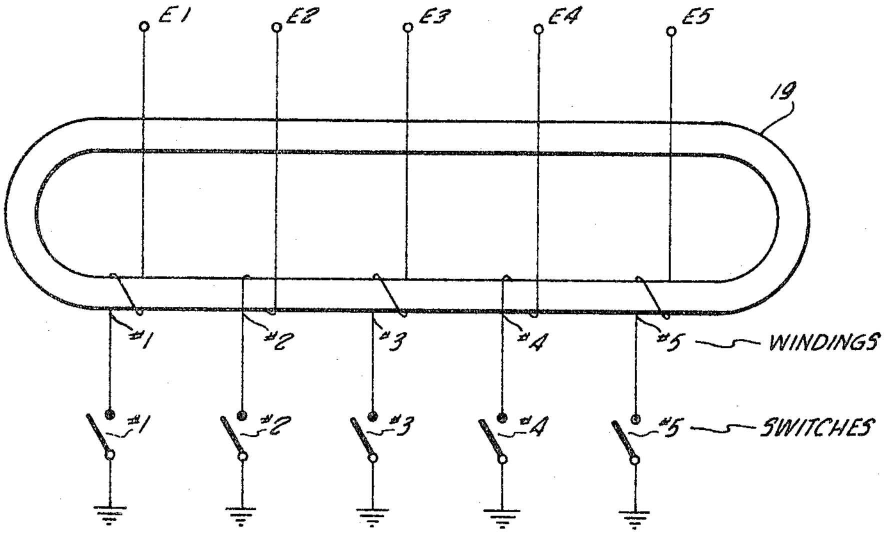
FIGURE 1 is a simplified schematic diagram of a signal converter embodying the present invention.

Refer now to FIG. 1 which shows a simplified schematic diagram of a signal converter which embodies the present invention. FIGURE 1 includes a magnetic core 19 which has a substantially rectangular hysteresis loop. FIGURE 3A is a diagram showing the rectangular hysteresis loop of the magnetic core 19 plotted on a graph with flux along one coordinate and ampere-turns, applied to the core 19, along the other. Five windings numbered #1 through #5 are magnetically coupled to the core 19. The windings #1 through #5 have a predetermined number of turns represented by the symbols N1 through N5, respectively. Five single-pole double throw switches numbered #1 through #5 are also provided and are connected between one end of the winds #1 through #5, respectively, and ground potential (0 volts). The other ends of the windings #1 through #5 from the switches #1 through #5 are connected to power supplies (not shown) represented by the symbols E1 through E5, respectively.

The windings #1, #3, and #5 are poled in one direction such that when their respective switches are closed, the flux in the core 19 is driven away from $\phi_{ref}$, one of the saturable states of the core 19. Windings #2 and #4 are poled in the opposite direction from the other windings such that when their responsive switches are closed, flux in the core 19 is driven toward $\phi_{ref}$. Switch #1 is for reading signals from the power supply E1, which actually may be a source of signals to be converted into the core 19.

The core 19 is an integrating element. The internal impedances of the power supplies E1 through E5 are very low. Therefore, the signals applied to the windings #1 through #5 are voltage signals as opposed to current signals. This causes the operation of the core to perform according to the equation.

$$\Delta\phi=\int_{t_0}^{t_0+\Delta t}\frac{e}{N}dt$$

Where $\phi$ is the change in flux in the core 19, $e$ is the voltage switched across a winding having N turns and $t$ is the total time the voltage $e$ is applied across the winding starting at an initial time to.

Encoding is initiated by first closing switch #2 and clearing the core 19. The signal from the source or power supply E1 is then read in for a fixed length of time. The sequence with which the switches #2 through #5 are subsequently closed then cause the encoding operation to take place. The sequence with which the switches #2 through #5 are closed cause a plurality of cycles of operation to take place for each signal to be encoded. The number of these cycles are equal to the number of digits in the resultant digital signal. During each cycle, three steps always take place: a comparison or subtraction step, a signal mapping step, and a signal scaling step. The read-in operation and the signal mapping and scaling steps are shown in FIG. 2.

Figure 2:
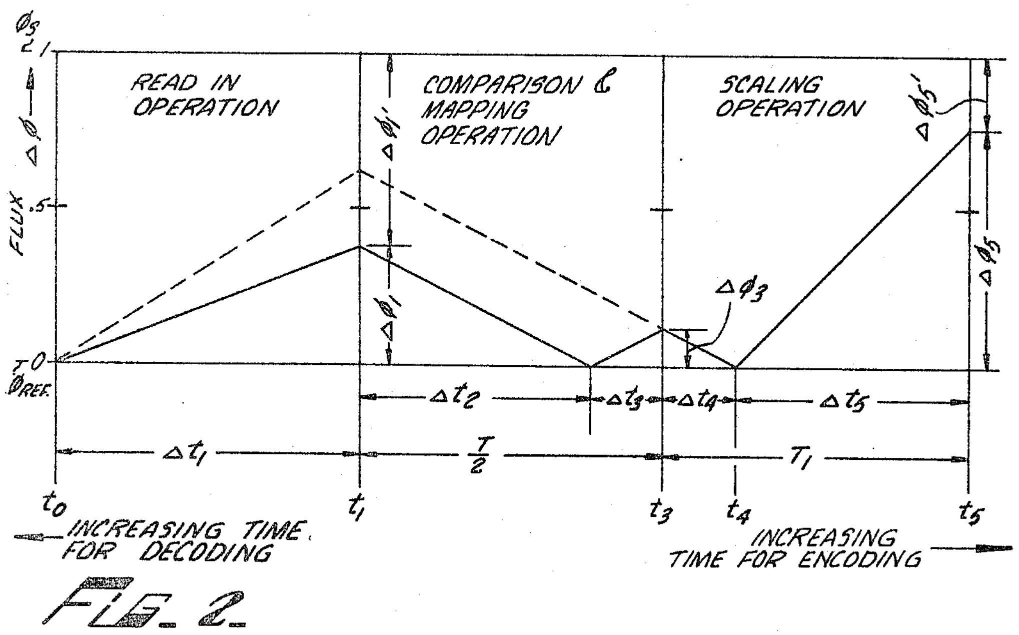
FIGURE 2 is a diagram showing the flux wave form in the core of the signal converter of FIG. 1 during a conversion operation.

FIG. 2 shows the wave shape diagram of the flux in the core 19. Flux is plotted along one coordinate between $\phi_{ref}$ and $\phi_s$, where $\phi_s$ is less than opposite saturation state of the core 19 from $\phi_{ref}$. $\phi_{ref}$ is assumed to be equal to 0. Therefore, flux is also plotted between 0 and 1 in fractions of $\phi_s$. Time is plotted along the other coordinate. For an encoder, time increases from left to right.

*Read-in operation*

Refer now to FIG. 2 during the read-in operation and assume initially that switch #2 was closed and the core 19 was cleared or saturated at $\phi_{ref}$. Switch #1 is closed starting at time $t_0$ and opened at time $t_1$. The total time the switch #1 is closed is $\Delta t_1$ and is fixed. The magnitude of the signal from the power supply $E_1$ determines the amount of flux $\Delta\phi_1$ initially stored in the core 19 with respect to $\phi_{ref}$. $\Delta\phi_1$ is proportioned to $E_1$, the signal to be converted. The flux $\Delta\phi_1$ is given by the equation $$\Delta\phi_1=\frac{\Delta t_1}{N_1}\overline{E}_1$$

where $\overline{E}_1$ is the average voltage applied across the winding #1 during the time interval $\Delta t$.

$\phi_s$ is defined by the equation $$\phi_s=\frac{\Delta t_1}{N_1}E_s$$

where $E_s$ is the standard or maximum signal to be converted. It is convenient to consider the flux stored in the core 19 as the difference between $\phi_s$, hereinafter called the standard flux signal, and the signal to be converted. This is given by the equation $$\Delta\phi_1'=\phi_s-\Delta\phi_1$$

Thus, it is seen that the redefined value of flux $\Delta\phi_1'$ corresponds to the corrected signal or value of flux referred to in Table III.

The following operations to be performed on the redefined or corrected flux signal $\Delta\phi_1'$ will be performed conditioned on the flux in the core 19 going to the reference level $\phi_{ref}$ and not $\phi_s$. Therefore, the $\phi_s$ does not need to be a stable detectable state of core 19.

*Comparison operation*

The comparison operation occurs between the times $t_1$ and $t_3$ in FIG. 2. During this operation, the corrected flux signal $\Delta\phi_1'$ is compared to the standard flux signal $\phi_s$. The time interval between time $t_1$ and time $t_3$ is called the time interval $T/2$. Comparison is performed by closing switch #2 and leaving it closed for the time interval $T/2$ or until the flux in the core 19 is reduced to zero, whichever occurs first. The time interval $T/2$ is defined as $$\frac{T}{2}=\phi_s\frac{N_2}{E_2}$$

Therefore, one-half the standard flux signal is given by the equation $$\frac{\phi_s}{2}=\frac{T}{2}\frac{E_2}{N_2}$$

Two cases will now be considered. The first is that where $\Delta\phi_1$ is greater than $\phi_s/2$ and the second is that where $\Delta\phi_1$ is less than $\phi_s/2$.

In the first case, where $\Delta\phi_1$ is greater than $\phi_s/2$, the switch #2 is closed causing the flux in the core 19 to be forced toward $\phi_{ref}$. However, the flux will not reach zero before the end of the time interval T/2. Instead, the flux will reach a value given by the equation $$\Delta\phi_3=\Delta\phi_1-\frac{\phi_s}{2}$$

The operation of the encoder for this condition is indicated by dashed lines in FIG. 2.

In the second case, where $\Delta\phi_1$ is less than $\phi_s/2$, the flux in the core 19 will reach zero before the end of the time interval T/2. The time required to reduce the flux to zero, or $\phi_{ref}$, is given by the equation $$\Delta t_2=\Delta\phi_1\frac{N_2}{E_2}$$

The remaining part of the interval T/2 is given by the equation $$\Delta t_3=\frac{T}{2}-\Delta t_2=\frac{N_2}{E_2}\left[\frac{\phi_s}{2}-\Delta\phi_1\right]$$

By detecting when the flux in the core 19 reaches zero, one can determine whether $\Delta\phi_1$ (and $\Delta\phi_1$) is greater or less than $\phi_s/2$. If the flux reaches zero before the time interval T/2, $\Delta\phi_1$ is less than $\phi_s/2$ and if the flux reaches zero after the time interval T/2, $\Delta\phi_1$ is greater than $\phi_s/2$.

The above was given for encoding in the binary number system. However, the same type of comparison may be used in non-binary number systems to determine whether the signal is above or below a fraction of a standard signal. For example, when encoding to a radix K, a succession of comparisons may be made by determining if the signal to be converted $\Delta\phi_1$ is greater or less than $\phi_s/K$, $$\frac{2\phi_s}{K}\cdots\frac{(K-1)\phi_s}{K}$$

This may be determined by closing the switch #2 and then observing the flux in the core 19 to determine the time at which it is reduced to zero or saturation level.

*Signal mapping*

The flux $\Delta\phi_3$ at the end of the time interval T/2 for a flux signal $\Delta\phi_1$ below $.5\phi_s$ must have the same value as it would if the signal $\Delta\phi_1$ were the same amount above $.5\phi_s$. This means flux must be restored in the core 19, in the case where $\Delta\phi_1$ is less than $\phi_s/2$, after saturation is reached. This is accomplished by closing switch #3 for the remainder of the time interval T/2. The flux signal $\Delta\phi_3$ for $\Delta\phi_1$ less than $\phi_s/2$ is given by the equation $$\Delta\phi_3=\Delta t_3\frac{E_3}{N_3}$$

Substituting the value of $\Delta t_3$, the equation becomes $$\Delta\phi_3=\frac{E_3}{N_3}\frac{N_2}{E_2}\left[\frac{\phi_s}{2}-\phi_1\right]$$

In order to effect the signal mapping discussed above, the absolute value of the flux signal $\Delta\phi_3$ for $\Delta\phi_1$ less than $\phi_s/2$ and $\Delta\phi_3$ for $\Delta\phi_1$ greater than $\phi_s/2$ that are symmetrical about $.5\phi_s$ must be made equal. Referring to the two values of $\Delta\phi_3$, this is accomplished if $$\frac{E_3\ N_2}{N_3\ N_2}$$

is equal to 1. Thus for $\Delta\phi_1$ less than $\phi_s/2$ $$\Delta\phi_3=\left|\Delta\phi_1-\frac{\phi_s}{2}\right|$$

where the symbols || means the absolute value. For $\Delta\phi_1$ greater than $\phi_s/2$, $$\Delta\phi_3=\left|\frac{\phi_s}{2}-\Delta\phi_1\right|$$

therefore the requirements of signal mapping are satisfied.

*Signal scaling*

During the signal scaling operation, the remainder flux signal $\Delta\phi_3$ is doubled. At time $t_3$ switch #4 is closed and the power supply E4 is connected across the winding #4. Flux in the core 19 is forced towards zero. When the flux reaches 0, switch #5 is automatically closed. This causes the flux in the core 19 to start being forced away from the zero level of flux. It should be noted that the value of the voltage from the power supply $E_4$ is selected so that flux is guaranteed to reduce to zero sometime during the time interval between $t_3$ and $t_5$. The time interval between $t_3$ and $t_5$ is defined by the equation $$T_1=\frac{N_4}{E_4}\left(\frac{\phi_s}{2}\right)$$

The time interval during which switch #4 is closed is expressed by the equation $$t_4=\frac{N_4}{E_4}\Delta\phi_3$$

Therefore, the remaining time of the interval $T_1$, during which the switch #5 is closed, is given by the equation $$\Delta t_5=T_1-\Delta t_4=\frac{N_4}{E_4}\left(\frac{\phi_s}{2}-\Delta\phi_3\right)$$

The flux signal at the end of the time interval $T_1$ is then given by the equation $$\Delta\phi_5=\frac{E_5}{N_5}\frac{N_4}{E_4}\left(\frac{\phi_s}{2}-\Delta\phi_3\right)$$

If the term $$\frac{E_5\ N_4}{N_5\ E_4}$$

is made equal to 2, then the equation for $\Delta\phi_5$ reduces to $$\Delta\phi_5=\phi_s-2\ \Delta\phi_3$$

The value of flux $\Delta\phi_5$ at the end of the time interval $T_1$ may now be redefined as $$\Delta\phi_5'=\phi_s-\Delta\phi_5$$

By substituting terms $\Delta\phi_5'$ becomes $$\Delta\phi_5'=2\left|\Delta\phi_1'-\frac{\phi_s}{2}\right|$$

Therefore, the corrected remainder signal $\Delta\phi_5'$ is exactly twice the remainder obtained by subtracting one-half the standard signal. Thus the cycle including the steps of comparison or subtraction, signal mapping and signal scaling are performed during which the steps 0, 1–A and 2 are implemented. Thus, all that needs to be added is a means for generating the digits of the digital number.

It should be noted again that signal scaling may also be used for encoding to a radix K. In this situation, the remainder after signal mapping would be scaled or increased by a factor of K in order to provide the correct signal for determining the next digit.

With the basic cycle of operation in mind, it should be noted that it may be applied to many different types of encoder circuits to produce the same digital output signal. Many of these circuits will be minor variations of the signal converter of FIG. 1. For example, with the proper choice of the number of turns on the windings, and the proper power supply voltages, a single circuit may be used to serve the functions of switches #2 and #4 and windings #2 and #4. Also the proper number of turns on the windings will allow the power supplies $E_2$ through $E_5$ to be eliminated and a single power supply substituted. Also by correct choice of turns on the windings and power supply voltage, the time interval $T_1$ may be made equal to the time interval $T_2$ so that these time intervals may be controlled by an oscillator producing a symmetrical wave form. This has been accomplished in the circuit of FIG. 3.

It should also be understood that there are other variations of the basic signal converter of FIG. 1. For example, one of the power supplies may be made to vary according to a square wave and thereby perform the functions of the switches and windings #3 and #5.

Although the previous discussion has been directed to encoders, the basic cycle and the resulting wave form of FIG. 2 is also applicable to decoding circuits. The pattern of flux for converting a digital signal to an analog signal such as $\Delta\phi_1$, would be similar to that of FIG. 2 but time would increase from right to left. For a decoder, the switches #1 through #5 would be closed in a series of sequences defined by the digits of the digital signal being converted and the final level of flux stored in the core 19 after all digits have been read would be the resultant analog signal. A circuit could then be used for generating an analog output signal proportioned to the first level of flux in the core 19.

Although a core 19 has been described by way of example for the integrating element, other integrating elements such as a capacitor may be substituted with appropriate substitution of control circuits. Also, although a saturation level has been described as the reference level, the invention is not limited to use of a saturable reference state but any reference level may be used by providing a means for detecting the level.

Refer now to FIG. 3 where partly a schematic and partly a block diagram is shown of a binary encoder implementing the steps listed in Table III. A source of voltage signals is provided for generating a voltage signal having an unknown level which is to be converted both into Gray coded signals and natural binary coder signals. A direct read-out scaling Gray code encoder 12 is connected to the output circuit of the source of signals 10. A timing generator 14 is connected to the scaling Gray code encoder 12 and provides bias signals and other timing signals to the scaling Gray code encoder 12 for sequencing its operation. The timing generator 14 first clears any initial signal out of the encoder 12, then reads in the unknown potential level to be converted. Next a series of digital signals is developed on a read-out line 16. The serial combination of digital signals developed on the line 16 represents the unknown voltage in the Gray code.

A logical gating circuit 18 is connected to the output of both the scaling Gray code encoder 12 and the timing generator 14. The logical gating circuit 18 will hereinafter be referred to as the logical gate 18 and has its output circuit connecterd to the input circuits of a code conversion flip-flop represented by the symbol C1. The logical gating circuit 18 and the code conversion flip-flop C1 together convert the serial Gray coded signals to a series of signals representative of the natural coded equivalent of the unknown voltage from the source 10. The series of signals in the natural code are developed at the output circuit $C_1$ of the code conversion flip-flop C1.

Refer now to the details of the scaling Gray code encoder 12. The encoder of FIG. 3 also has a magnetic core 19. Four primary windings, 21 through 24, are magnetically coupled to the core 19. Associated with the primary windings 21 through 24 are four windings 31 through 34, respectively. The primary windings 21 and 22 have the same number of turns, represented by the symbol N. The primary windings 23 and 24 have one-half the number of turns of the primary windings 21 and 22, represented by the symbol N/2. Switching circuits 41 through 44, which are transistor switches, are provided for switching voltage across the primary windings 21 through 24, respectively. The transistor switch 41 is a PNP type of transistor which has its collector electrode connected to one end of the primary winding 21 and its emitter electrode connected to ground, or zero volts potential. The base electrode of transistor switch 41 is connected to one end of the winding 31 which is a feedback winding. The transistor switches 42 and 43 are similar to the transistor switch 41 except that their collector electrodes are connected to the primary windings 22 and 23, respectively, and their base electrodes are connected to the windings 32 and 33, respectively, which are also feedback windings. The transistor switch 44 is also a PNP transistor and has its collector electrode connected to the output circuit of the source of signals 10 and its emitter electrode connected to one end of the primary winding 24. The base electrode of the transistor switch 44 is connected in series through a resistor 46 to one end of the winding 34. The base electrode is also connected through the cathode to anode electrodes of a diode 35 to the read-in line 54. The opposite ends of the primary windings 21 through 23, from that connected to the transistor switches 41 through 43, are connected to a negative power supply represented by the symbol —V, for providing voltage to these windings. The opposite end of the primary winding 24, from that connected to the transistor switch 44, is connected to ground. The end of the windings 31 through 34, opposite from the end connected to the base electrodes of the transistor switches 41 through 44, are connected to bias and control lines 51 through 53 and a read-in line 54, respectively. The primary windings 22, 23, and 24 are all poled in the same direction but are poled in the opposite direction from the primary winding 21. Thus, current flowing from ground through the transistor switches 42, 43, and 44 and the primary windings 22, 23, 24, respectively, induce flux in the core 19 in the opposite direction from that caused by current from ground through the transistor switch 41 and the primary winding 21. To be explained in the following discussion, the timing generator 14 provides timing pulses or bias signals to the lines 51 through 54. Each of the windings 31 through 34 are poled such that when a bias signal of approximately zero volts is appplied to any one of the lines 51 through 54, and current flows through the associated primary winding due to the conductive state of the associated transistor switch, the flux induced in the core 19 by the primary winding causes a signal to be developed in the associated winding which switches or biases the associated transistor switch into conduction.

With the circuit details of the scaling Gray code encoder 12 in mind, refer now to the block diagram of the timing generator 14. The timing generator 14 has a pulse generator means including a magnetic core oscillator 56, bias and control circuits 58 and 62, and gating circuits 60 and 61 and a trigger gating circuit 63. The magnetic core oscillator 56 is a source of timing pulses or signals and has two output circuits represented by the symbols **56*a* and 56*b* at which negative and postive rectangular recurring timing pulses are developed. The time interval of all the negative and positive timing pulses at the output circuits 56*a* and 56*b* are substantially equal. Also, the output signal at the output circuit 56*a* is the complement of that at the output circuit 56*b*. Thus, when the output circuit 56*a* is at a high potential level, the output signal at the output circuit 56*b* is at a low potential level, and vice versa. The magnetic core oscillator 56 has another output circuit 56*c* at which rectangular recurring pulses are developed which are in phase with and have the same wave shape as the signals developed at the output circuit 56*a*. The output circuit 56*c* is connected to the input circuit of the logic gate 18**.

The output circuit **56*a* is connected through the series connection of the bias and control gate 58 and the gating circuit 60 to the bias and control line 53. The ouput circuit 56*b* of the magnetic core oscillator 46 is connected through the series connection of the bias and control gate 62 and the gating circuit 61 to the bias and control line 52. Input circuits of the trigger circuit 63 are connected to the output lines 56*a* and 56*b*. The output circuit of the trigger circuit 63 is, in turn connected to the bias and control line 51**.

A read-in flip-flop R1 is provided in the timing generator 14. The read-in flip-flop has two output circuits represented by the symbols $R_1$ and $R_1'$. The output circuit $R_1'$ is connected to input circuits of the gates 60 and 61 and a reset input circuit of the code conversion flip-flop C1. The output circuit $R_1$ is connected to the read-in line 54. To be explained, the read-in flip-flop R1, the feedback winding 34, resistor 46, diode 35, and the transistor switch 44 form a read-in circuit for coupling signals from the source of signals 10 to the core 19.

The read-in flip-flop R1 has two input circuits and corresponding thereto two states of operation, a true state and a false state. One input circuit is referred to as the set circuit. Whenever a negative pulse or trigger signal is developed at the set input circuit, the read-in flip-flop R1 will be triggered from a false state into a true state. The other input circuit of the read-in flip-flop R1 is called a reset circuit. Whenever a negative pulse or trigger signal is developed at the reset circuit, the read-in flip-flop R1 is triggered from a true state into a false state. When in a true state, the read-in flip-flop develops a positive or high potential signal at the output circuit $R_1'$ and a low or large negative potential signal at the output circuit $R_1$. When the read-in flip-flop R1 is in a false state, the potential levels at the output circuits are reversed. Thus the read-in flip-flop R1, diode 35, and the transistor switch 44 provide a control circuit for switching the source of signals 10 across the primary winding 24 whenever the read-in flip-flop R1 is in a true state. Bistable trigger circuits or flip-flop circuits are well known in the electronic art, therefore, no further reference will be made to them.

A magnetic core counter 64 has its input circuit for counting pluses connecter to the output circuit 56*b* of the magnetic core oscillator 56. The magnetic core counter 64 has two output circuits, one of which is connected to the set input circuit of the read-in flip-flop R1. The other output circuit of the counter 64 is connected to the base electrode of the transistor 41.

With the general organization of the binary encoder of FIG. 3 in mind, refer now to FIG. 5 FIGURE 5 shows a detailed schematic diagram of all the circuits in the timing generator 14 except for the read-in flip-flop R1. First refer to the magnetic core oscillator 56. The magnetic core oscillator 56 is a conventional core oscillator employing a magnetic core 68. The magnetic core 68 has a substantially rectangular hysteresis loop as illustrated in FIG. 3A. Oscillators of this type are shown and described in an article by G. H. Royer which appears on pages 322 through 324 of the Transactions of the American Institute of Electrical Engineers, vol. 74, Part I, "Communication & Electronics." FIGURE 2 of this article shows a schematic diagram of magnetic core oscillator similar to that shown herein in FIG. 5. Similar to this article, the magnietic core oscillator 56 has a magnetic core 68, primary windings 69 and 71, and feedback windings 65 and 67. PNP transistors 77 and 79 are provided and are connected to the primary windings 69 and 71, respectively, and the feedback windings 65 and 67, respectively. The magnetic core oscillator 56 is different from the above-referenced article in that it has the parallel combination 70 of a resistor and copacitor connected between the base electrode of each transistor and its associated feedback winding. The parallel resistor capacitor combination 70 provides speed-up action for switching of the transistors 77 and 79. In contrast to the above-referenced article which has a separate output winding, the output circuit of the magnetic core oscillator 56 is taken at the junction of each capacitor resistor combination 70 and associated feedback winding. The output circuit 56*a* is taken at the feedback winding 67 whereas the output circuit 56*b* is taken at the feedback winding 65.

Also located in the magnetic core oscillator 56 is a positive voltage power supply 72. The positive power supply 72 has two windings 73 and 74 magnetically coupled to the magnetic core 68. One end of the winding 73 is connected to the cathode of a diode 76. One end of the winding 74 is connected to the cathode of another diode 78. The anodes of the diodes 76 and 78 are both connected to ground. Thus, it may be seen that oscillation of the flux induced in the magnetic core 68 due to oscillator action, will induce signals in the windings 73 and 74. The windings 73 and 74 are poled in a direction such that when a positive potential is developed at the cathode of the diode 76, a negative potential is developed at the cathode of the diode 78 and vice versa. The other ends of the windings from the diodes 76 and 78 are joined together and connected to an output line 72*a*. Positive potential signals are developed on the output line 72*a* by the positive power supply 72. If the magnitude of the plus voltage signals developed on the line 72*a* is about two and one-half times that of the —V power supply, diode 35 may be eliminated.

The bias and control circuit 58 has a capacitor 80 connected to the cathode of a diode 81. The anode of the diode 81 is connected to the cathode of the diode 78. The other side of the capacitor 80 from the diode 81 is connected to the output line 56*a* of the oscillator 56.

The bias and control gate 62 is identical to the bias and control circuit 58 except that it is connected to the cathode of the diode 76, the output circuit 56*b* of the oscillator 56, and the gate 61.

The gates 60 and 61 each comprise a single resistor 82 and 83, respectively. One of the ends of the resistors 82 and 83 are connected to the output circuit $R_1'$ of the read-in flip-flop R1. The other ends of the resistors 82 and 83, from the read-in flip-flop R1, are connected to the junction of the diode 81 and capacitor 80 of the bias and control gates 58 and 62, respectively. The junction of the resistors 82 and 83 and the output circuits of the bias and control gates 58 and 62 are connected to the bias and control lines 52 and 53, respectively.

The trigger circuit 63 has two differentiating or pulse shaping circuits. One differentiating circuit has a diode 84 connected in series with a resistor 85. The cathode of the diode 84 is connected to the output circuit 56*b* of the oscillator 56 and the resistor 85 is connected to ground. A capacitor 86 is provided and has one of its plates connected to the anode of the diode 84. A voltage divider consisting of resistors 90 and 91 is connected between a +E power supply (not shown) and ground. The other plate of the capacitor 86 is connected to the junction of resistors 90 and 91. The other pulse shaping circuit is identical to the first and has a diode 87, a resistor 88, and a capacitor 89. However, the cathode of the diode 87 is connected to the output crcuit 56*a* rather than 56*b*. The junction of the resistors 90 and 91 is also connected to the bias and control line 51.

Refer now to the magnetic core counter 64. The magnetic core counter 64 comprises a preset step counter or frequency divider of the type described in an article by G. F. Pittman, Jr. on pages 54 through 58 of the above-referenced Transactions of the American Institute of Electrical Engineers. The counter 64 has a magnetic core 92 which has a substantially rectangular hysteresis loop similar to that shown in FIG. 3A. Five windings 94 through 98 are coupled to the magnetic core 92. The winding 94 has one end connected to the collector of a PNP type transistor 100. The emitter electrode of the transistor 100 is connected to ground. The base electrode of the transistor 100 is connected through the cathode to anode electrodes of a diode 102 to one end of the winding 95. The other end of the winding 95 is connected to ground. A resistor 107 is connected between the base electrode of the transistor 100 and the output line 56*b* of the magnetic core oscillator 56. A PNP transistor 106 is also provided and has its emitter electrode connected to ground and its collector electrode connected to one end of the winding 97. The other end of the winding 97, from the end connected to the transistor 106, is connected to the negative power supply —V. The base electrode of the transistor 106 is serially connected through a resistor 108 to one plate of a capacitor 110. The other plate of the capacitor 110 is connected to ground. The junction between the resistor 108 and the capacitor 110 is serially connected through a resistor 112 to one end of the winding 96. The other end of the winding 96, from the resistor 112, is connected to the clear line 64b through the serial connection of a diode 66. The diode 66 is poled with its anode connected to the clear line 64b. The winding 98 is connected between the diode 66 and the output line 72a of the positive power supply 72. The base electrode of the transistor 106 is also serially coupled through the cathode to anode electrodes of a diode 112 to a plate of a capacitor 114. The other plate of the capacitor 114 is connected to the output line 56b of the oscillator 56. The junction between the capacitor 114 and the diode 112 is serially connected to the collector of the transistor 106 through a resistor 116.

A radix selector 130 is provided and, to be explained, allows the number of counts required to saturate the magnetic core 92 to be varied. The radix selector 130 has a voltage divider comprising four resistors connected in series. One end of the voltage divider 132 is connected to the negative power supply −V. A five-position switch 134 is provided with each of its contacts connected at a separate end of one of the resistors in the voltage divider 132. The pole of the switch 134 is connected through a resistor 136 to ground.

A pulse selector circuit 118 is connected between the collector of the transistor 106 and the line 64a which is connected to the set input circuit of the read-in flip-flop R1. The pulse selector circuit 118 has a capacitor 120 serially connected to a diode 122. One side of the capacitor 120 is connected to the collector of the transistor 106 and the anode of the diode 122 is connected to the line 64a. The junction between the diode 122 and the capacitor 120 is connected to the anode of a diode 124. The cathode of the diode 124 is serially connected through resistor 126 to ground. The junction between the diode 124 and the resistor 126 is connected through a resistor 128 to the negative power supply −V.

With the details of the circuits of FIG. 5 in mind, an explanation will now be given of their operation. Refer first to the magnetic core oscillator 56. The oscillator section of the magnetic core oscillator 56 continuously oscillates and causes the core 68 to be driven from one saturation state to the other. This causes rectangular recurring pulses at the output circuits 56a and 56b which vary between a positive potential and a negative potential. The wave shapes on the lines 56a and 56b are generally the same as that shown in FIG. 4A for the bias and control lines 53 and 52, respectively.

Assume that the read-in flip-flop R1 is in the non-read-in state, therefore the output circuit $R_1$ is at a high or positive potential, turning transistor 44 off, and the output circuit $R_1'$ is at a negative or low potential level. Since the bias and control line 53 is connected to the output circuit $R_1'$ through the resistor 82, the bias and control line 53 is biased down towards a negative potential. However, the forward biased condition of diode 78 clamps the potential on the bias and control line 53 at a slightly negative potential. This operation is illustrated in FIG. 4A during the last half of clock periods 1 and 3 through 7.

When the potential on the line 56a rises to a positive potential the bias and control circuit 58 couples this signal through to the bias and control line 53. This operation is illustrated by the wave shape in FIG. 4A during the first half of the clock periods 1 through 7. The capacitor 80 of the bias and control circuit 58 connects line 53 to the line 56a which has a voltage of the same wave form as that desired on line 53, but a larger magnitude. The signals on the line 56a tend to shorten the rise time on line 53 in order to make its control on transistor 43 more precise.

The operation of the bias and control circuit 62, the diode 76, and the resistor 83 are identical to that of the bias and control circuit 58, the diode 78, and the resistor 82 except that the signals are displaced one-half clock period as shown in FIG. 4A.

Assume now that the read-in flip-flop is in a non-read-in state of operation. This causes the signal at the output circuit $R_1'$ to be at a positive or high potential. When the potential on the line 56a drops, the resistor 82 has a small enough impedance that the positive potential at the $R_1'$ output circuit holds the bias and control line 53 at a positive potential level; see, for example, the last half of clock period 2 of FIG. 4A. The operation of the resistor 83 is identical for controlling the signal on the bias and control line 52.

Refer now to the signals on the bias and control line 51. The voltage divider consisting of the resistors 90 and 91 and the positive power supply +E normally bias the bias and control line 51 to a slightly positive potential with respect to ground. The diodes 84 and 87 block out positive pulses on the lines 56b and 56a but couple negative potential signals on these lines to the capacitors 86 and 89, respectively. Whenever the signal on the line 56a drops to a negative potential, this signal is coupled through the diode 87 and is differentiated by the action of the voltage divider, the capacitor 89, and the resistor 88. This causes a negative spike or pulse to be applied to the bias and control line 51. The action of the diode 84, resistor 85, capacitor 86, and voltage divider resistors 90 and 91 is the same for negative pulses on the line 56b. The wave shape of the differentiated pulses is shown in FIG. 4A. Thus, it may be seen that each time there is a transition in potential between one level and another at the output circuits 56b and 56a, a pulse is always applied on the bias and control line 51. These pulses are referred to hereinafter as clock pulses.

The sample line 56c is connected to the cathode of the diode 78. Therefore, rectangular recurring pulses with the same phase and general wave shape as the signals on the bias and control line 53 will be developed on the sample line 56c.

Refer now to the operation of the magnetic core counter 64. The function of the counter 64 is to provide a negative bias signal or clear signal on the clear line 64b and a set signal to the read-in flip-flop R1 after a preset number of negative pulses on the line 56b. To be explained, the number of negative pulses applied on the line 56b before the core 92 saturates is equal to the number of digits in the resultant binary coded number out of the encoder of FIG. 3. Each time a negative pulse is applied on the line 56b, it biases transistor 100 into conduction. This causes current to flow through the transistor 100, the winding 94, the voltage divider 132 to the power supply −V. Refer to FIG. 3A and assume that it represents the hysteresis loop of the core 92 and that the current in the winding 94 tends to force the core 92 towards saturation at the point $\phi_{ref}$. The stored flux in the core 92 when the core initially started receiving these negative pulses was an amount that caused the core 91 to finally saturate at approximately the end of a negative pulse. The bias to the base of the transistor 106 and the polarity of the winding 96 are such that when the core 92 saturates, the signal induced in the winding 96 biases the transistor 106 into conduction. The winding 97 is poled with respect to the winding 94 such that the flux in the core 92 is urged away from the saturation level at $\phi_{ref}$. The winding 96 then provides a feedback signal to the base of the transistor 106 and maintains it in a conductive state of operation. The conductive condition of transistor 106 continues until the potential on the line 56b drops from the positive potential developed following the point at which the core 92 was saturated, to a low potential level and then rises back to a positive potential level. As the signal on the line 56b rises back to the positive potential level the second time, the positive potential signal is coupled through the capacitor 114, the diode 112, to the base electrode of the transistor 106 biasing it into a non-conductive condition. This causes the collector of the transistor 106 to drop to a negative potential. The flux in the core 92 is now at some point indicated by the symbol K in FIG. 3A. The time interval between the point at which the core 92 is driven into a saturated state of operation at $\phi_{ref}$ and the point the flux reaches point K is exactly equal to one cycle of the signal on the line **56*b*** or the time between the end of one negative pulse and the end of the next. Also, point K is less than the opposite saturation flux level from $\phi_{ref}$. The reason for this arrangement is that it allows the number of pulses required to resaturate the core at $\phi_{ref}$ to be independent of the output level of the power supply —V.

When transistor 106 conducts, the change in potential on the collector of transistor 106 causes capacitor 120 of the pulse selector 118 to receive a charge through diode 124. When transistor 106 ceases to conduct the negative change of collector potential causes the junction of capacitor 120 and diode 124 to swing negative also and, through diode 122, to produce a negative pulse on line **64*a*. The voltage divider of resistors 126 and 128 biases the cathode of diode 124 so that only the large excursions in collector potential on transistor 106** can cause such a pulse.

The winding 98 is poled such that during the time the transistor 106 is conductive and the core 92 is being reset to point K, a negative potential signal is developed on the clear line **64*b* and biases the transistor 41** into a conductive condition.

Also, the number of pulses required to reset or saturate the core 92 from point K to the reference level $\phi_{ref}$ is dependent on the setting of the switch 134. By setting the switch such that there is a higher voltage applied to the winding 94, it will take fewer pulses to saturate the core 92 and vice versa. Thus, the radix selector 130 may be adjusted so that more digits may be provided in the binary number out of encoder 12 by changing the setting of the switch 134 and thereby changing the number of pulses required to resaturate the core 92.

With the details of FIG. 5 in mind, refer now to the logical gating circuit 18 shown in FIG. 6. The read-out line 16 is connected through the serial connection of a capacitor 152, a diode 148, a capacitor 142, and a resistor 140, in order of connection, to ground. The diode 148 is poled with its anode connected by means of a line 150 to the capacitor 152. The sample line **56*c* is connected to the junction of the capacitor 142 and the resistor 140. The other side of the capacitor 142, from the sample line 56, is connected to the cathode of a diode 144. The anode of the diode 144 is connected through the resistor 154 to the line 72*a* from the positive power supply 72. The junction of the diode 144 and the resistor 154 is connected to the Gray code line 20**.

The operation of the gating circuit 18 will now be explained. Whenever a negative potential signal is developed on the sample line **56*c* and no signal is developed on the read-out line 16, the negative signal on the sample line 56*c* is coupled through the capacitor 142 to the cathodes of the diodes 144 and 148. This causes a negative spike or pulse to be applied to the Gray code line 20. The magnitude of the positive signals to the read-out line 16 are slightly larger than that of the negative pulses on the sample line 56*c*. Thus when a negative pulse is applied on the sample line 56*c* coincident with a positive change in signal on the read-out line 16, the two signals cancel leaving a positive potential signal at the cathode of the diode 144. Therefore, the Gray code line 20** remains at a slightly positive potential.

The code conversion flip-flop C1 is a conventional time delay type of flip-flop in which a negative pulse at both the set and reset input circuit pulses it into the opposite state from which it is then operating. Thus, whenever a negative pulse is applied on the sample line **56*c*, without a positive change in signal applied to the read-out line 16, the code conversion flip-flop C1 will be triggered from the state in which it is then operating to the opposite state of operation. Also, the code conversion flip-flop has a separate reset circuit connected to the $R_1'$ output circuit of the read-in flip R1. Whenever the read-in flip-flop R1 triggers from a read-in to a non-read-in state of operation, the signal at the $R_1'$ output circuit changes from a positive to a negative potential level. This change from a positive to a negative potential level always triggers the code conversion flip-flop C1 from a true state to a false state. A separate reset circuit for a time delay flip-flop of the type needed for C1** may comprise an "or" type of gating circuit at the reset input circuit of the flip-flop circuit.

With the details of the schematic diagrams of FIGS. 3, 5, and 6 in mind, a description of the operation of the binary encoder of FIG. 3 will now be given with reference to the wave shape diagrams shown in FIGS. 4A and 4B. Refer now in general to FIG. 4A. The clock pulse signals on the bias and control line 51 are shown. Also shown in time relationship to these clock pulses are the wave shapes on the bias and control lines 52 and 53, the read-in line 54, the clear line **64*b* and the sample line 56*c*. When the FIG. 4B is aligned with FIG. 4A as shown in FIG. 4, the level of flux in core 19 as well as the wave shape of the signals on the read-out line 16, the line 150 in the logic gate 18 and the Gray code line 20 are shown in time relation to the clock pulses on the bias and control line 51. At the lower part of FIG. 4B, the natural binary coded output signal from the code conversion flip-flop C1 is shown and also arranged in time relationship to the clock pulses. To be further explained in the following description, the Gray coded digits are read out on the Gray code line 20 and the natural binary coded digits are read out of the code conversion flip-flop C1 beginning with the most significant digits first and the least significant digits last. FIG. 4B also shows when each of the transistors 41 through 44** are conductive and non-conductive.

Clock periods are shown along the top of FIG. 4A and are referred to in the following discussion. A clock period is defined as the time interval between the peak of one clock pulse and that of the second clock pulse following. Thus, a clock period will have two clock pulses defining the beginning and end of a clock period as well as a clock pulse at the middle of the clock period. Flux in the core 19 is shown varying between $\phi_{ref}$ and $\phi_s$ (see FIG. 3A), where $\phi_s$ is the standard or maximum amount of flux which will ever be stored in the core 19 relative to $\phi_{ref}$. The flux in core 19 is plotted in FIG. 4B between 0 and $\phi_s$ in fractions of $\phi_s$. It should also be noted that FIGS. 4A and 4B show the wave shapes with positive voltage going down and negative voltage going upwards.

Assume now that the encoder of FIG. 3 is near the end of the first half of clock period 1. The signal on the read-in line 54, the bias and control lines 51 and 53, the clear line **64*b*, and the sample line 56*c* are all at a positive potential level. The signal on the bias and control line is at a slightly negative potential level. The read-in flip-flop R1 is in a non-read-in state of operation as indicated by the large positive potential level on the line 54 and the level of flux in the core 19** is at some random level.

After the end of the first half of clock period 1, the counter 64 develops a negative potential signal on the clear line **64*b* and the sample line 56*c*. The oscillator 56 develops a slightly negative potential signal on the bias and control line 53 and a large positive signal on the line 52. The negative potential on the clear line 64*b* biases the transistor switch 41 into conduction casing the flux in the magnetic core 19** to start being driven towards zero or saturation.

A clock pulse is applied to the bias and control line 51 at the end of clock period 1. However, the transistor 41 is already conducting due to the bias on line **64*b* and the conductive state of transistor 41** is unchanged.

During the first half of clock period 2, the levels of the signals on lines 52, 53, and 56c reverse. However, the potential on the clear line 64b remains negative.

At the beginning of the second half of the clock period 2, a set signal is developed at the input of the read-in flip-flop R1 by the magnetic core counter 64, setting the read-in flip-flop R1 into a read-in state. The read-in state of the read-in flip-flop R1 causes a negative potential to be developed on the read-in line 54, biasing transistor 44 into conduction. Also a large positive potential is developed at the $R_1'$ output circuit of the read-in flip-flop R1, causing the signal on the bias and control line 53 to remain at a large positive potential. With the transistor 44 conducting, the output potential level from the source of signals 10 is read into the core 19.

At the beginning of the first half of clock period 3, the read-in flip-flop R1 is reset to a false state by a signal from the oscillator 56. This causes the signal on the read-in line 54 to rise to a large positive potential level and the read-in transistor 44 is cut off. Also, the potential at the output circuit $R_1'$ drops to a negative potential causing the code conversion flip-flop C1 to be triggered to a state representing a digit "0."

Assume now that the value of flux stored in the core 19 during the last half of clock period 2 is $0.77\phi_S$. This amount of flux corresponds to the decimal number 0.77 converted in Table IV, and, therefore, the resultant binary numbers during the following operation will be the same as those shown in Table IV. It should also be noted that the standard signal described for Table III corresponds to the flux signal $\phi_S$. The difference between $0.77\phi_S$ and $\phi_S$ is $0.23\phi_S$, the initial corrected signal to be converted in Table IV.

Referring again to the operation, at the beginning of clock period 3, a clock pulse is developed on the bias and control line 51. This causes the transistor 41 to again be triggered into conduction. The current in the primary winding 21, due to the conductive state of transistor 41, starts subtracting one-half $\phi_S$ from $0.23\phi_S$ driving the flux in the core 19 towards the reference level of flux performing step 1–A of Table III. The signal on the bias and control line 53 is at a large positive potential level and the signal on the bias and control line 52 at a slightly negative potential level during this same interval of clock period 3. Also, the sample line 56c is at a positive potential level. At the middle of clock period 3 the transistor 41 is still conducting and does not change its conductive state. Therefore, there is not a positive change in potential on the read-out line 16 to cancel out the negative change in potential on the sample line 56c. Thus, a negative trigger signal, representing a digit "1" of the Gray code number is applied to the code conversion flip-flop C1 causing it to be triggered from a state representing a natural binary digit "0" to that representing a "1."

Referring to Table IV, it will be noted the first Gray coded digit and natural binary coded digit are both a binary digit "1" the same as that shown in FIGURE 4B during clock period 3.

During the last half of clock period 3, the signals on the bias and control lines 53 and 52 change to a slightly negative and a large positive potential, respectively. Also, the transistor 41 continues to conduct until the core 19 saturates at the 0 flux level. The slightly negative potential on the bias and control line 53 causes the transistor 43 to be biased such that the transient of transistor 41 cutting off triggers the transistor 43 into conduction. The conductive state of transistor 43 immediately causes current to flow through the primary coil 23 starting to drive the flux in the core 19 away from the saturation state at a 0 flux level.

The action of the transistor 41 and the transistor 43 during the last half of clock period 3 changes the flux signal in the core 19 such that the difference between the flux stored in the core 19 and $\phi_S$ is $0.54\phi_S$. This value of flux is exactly twice that in the core at the end of the first half of clock period 3. Therefore, it should now be evident that during the first half of clock period 3, one-half of the standard level of flux, $0.5\phi_S$, was subtracted from the corrected unknown signal $0.23\phi_S$. This carried out step 1–A of Table III. When the flux in the core 19 did not saturate during the first half of clock period 3, this indicated that the remainder signal $0.27\phi_S$ is negative. Then during the last half of clock period 3, the absolute value of the remainder signal, $0.27\phi_S$, was doubled and restored in the core 19 as a signal $0.54\phi_S$. This is the operation indicated in step 2 of Table III.

At the beginning of the first half of clock period 4, the signals on the bias and control lines 52 and 53 change to a slightly negative potential level and a large positive potential level, respectively. Also, a clock pulse is developed on the bias and control line 51. This causes the transistor 43 to be cut off and the transistor 41 to be triggered into conduction. With the transistor 41 in conduction flux is again subtracted from the flux signal stored in the core 19. Before the clock pulse occurs at the middle of clock period 4, the core 19 is driven into a saturated condition. This indicates the subtraction is resulting in a positive number. When the transistor 41 stops conducting due to saturation of the core 19, the transistor 42 is triggered into conduction completing the subtraction step of operation.

The clock pulse on the bias and control line 51 at the middle of clock period 4, triggers the transistor 41 into conduction again and the signal on the bias and control line 52 rises to a large positive potential level causing the transistor 42 to cut off. The transition from the non-conductive to the conductive condition of transistor 41 induces a positive change in potential on the read-out line 16. This causes a positive spike of potential to be developed on the line 150 (see FIG. 6) in coincidence with the negative pulse on the sample line 56c. This causes a cancellation of the signals and a negative pulse is not developed on the Gray code line 20 at the middle of clock period 4. Therefore, a Gray code digit "0" is read-out by the scaling Gray code encoder 12. The code conversion flip-flop C1 remains in a true state and represents a natural coded digit "1."

Referring to Table IV, it should be noted that in step 2, the Gray coded digit is a "0" and the natural coded digit is a "1" the same as that read-out by the scaling Gray code converter 12 and the code conversion flip-flop C1.

The operation of the binary encoder of FIG. 3 during the last half of clock period 4 and clock periods 5, 6 and 7 is similar to that described for the clock period 3 and the first half of clock period 4. During clock periods 5, 6 and 7, the three digits 1, 0, 0 of the Gray coded signal are read-out of the scaling Gray code converter 12 and the digits 0, 0, 0 of the natural coded number are read-out of the code coversion flip-flop C1. These are identical to the digits developed during steps 3, 4 and 5 of Table IV.

Although only five digits are shown being read-out in FIG. 4B, it should be understood that the operation continues through four more clock periods (not shown) during which four more digits of the converted signal are read-out. These digits will be identical to the digits shown in Table IV during steps 6, 7, 8 and 9.

It is important in the encoding system of FIG. 3 that the flux in the core 19 be under the control of one or more low impedance windings at all times. This provides more linear conversion than could be obtained otherwise since flux overshoot and undershoot are eliminated. It should also be noted the binary encoder may be made independent of power supply voltage variations by using a fraction of the same source of signals for the read-in signal as for the negative power supply −V. This allows the encoder to operate independent of power supply variations.

It should be noted that other rearrangements of the circuits of FIG. 3 may be made. For example, the binary encoder circuit only needs to use saturation in one direction for a reference, therefore, a core oscillator is not necessary as a timing reference. The only system requirements on the encoder of FIG. 3 are that there be two approximately equal half periods of operation such as those defined by the clock pulses of FIG. 4A. If the two half periods are not equal, the first half period must be longer than the second. Another requirement is that the frequency remains high enough that the core 19 does not saturate in the direction opposite from the 0 flux level.

As already noted, the binary encoder of FIG. 3 may be incorporated in a communication system for voice to coded digital signals conversion. In such a system, a stabilized crystal oscillator may be used for synchronizing the encoder to the timing in the communication system. Also, a complete pulse code modulator can be made for a communication system with only three cores and a relatively few number of transistors and incorporating the present invention. When suitable volume compression and expansion equipment are connected to the binary encoder of FIG. 3, it can be used to produce high quality voice reproduction for telephone and radio systems.

Also, the encoder may be incorporated in data transmission system, data control systems, and in digital computer systems to synchronize the encoder timing with a central source of timing signals.

What is claimed is:

1. A signal converter for converting electronic signals comprising a signal integrating means for storing signals to be converted and having at least one reference level of signal, first means operative independent of the level of signal in the integrating means for driving the signal stored in said integrating means toward said reference level at predetermined times during a conversion cycle, and second means connected to be responsive to said reference level for driving the signal stored in said integrating means away from said reference level intermediate the driving by said first means, the operation of said first and second means whereby causing the level of signal in said integrating means to define a triangular pattern with time for each signal converted.

2. An encoder for converting an analog signal to a digital signal comprising a signal integrating means having at least one detectable reference level of signal therein, means adapted to become operative and then inoperative at the beginning of a conversion cycle for reading a signal into said integrating means, first means connected for driving analog signals stored in said integrating means toward said reference level a plurality of times for each analog signal converted, second means connected to be responsive to said reference level for driving the signal in the integrating means away from said reference level intermediate the driving by said first means, and means for sensing the direction of change in signal in the integrating means at predetermined time intervals and for forming signals representing digits of the digital signal as defined by the direction of change in signal in the integrating means representative of a digit of the digital signal.

3. Apparatus for converting an analog input signal directly to a binary coded signal, comprising: integrating means; means for coupling and uncoupling an input signal to said integrating means at the beginning of a conversion cycle for storing a signal having a value intermediate reference signal and standard signal values of the integrating means; means for changing the stored signal toward the reference signal value commencing at the beginning of a preselected time interval at such a rate as to decrease the value thereof by one-half the differential of the standard and reference signal values over such time interval; means for monitoring the integrating device for detecting if the stored signal reaches the reference value during such time interval; and means for forming a signal representative of a predetermined binary coded bit of the binary coded signal conditioned on the detection of the stored signal having reached the reference value during such time interval.

4. A signal converter for converting electronic signals comprising a signal integrating means for storing signals to be converted, a source of timing signals, first means arranged for driving the signal stored in said integrating means toward a reference level in response to said timing signals a plurality of times for each signal converted, and second means arranged for selectively driving the signal stored in said integrating means away from said reference level intermediate the driving by said first means and responsive to said reference level, said first and second means thereby causing the level of signal in said integrating means to define a triangular pattern with time for each signal converted.

5. A signal converter for converting electronic signals comprising a signal integrating means for storing signals to be converted and having at least one reference level of signal, a source of timing signals, first means arranged for driving the signal stored in said integrating means toward said reference level in response to said timing signals a plurality of times for each signal converted, second means arranged for driving the signal stored in said integrating means away from said reference level intermediate the driving by said first means and responsive to said reference level, the operation of said first and second means thereby causing the level of signal in said integrating means to define a triangular pattern with time for each signal converted, and means for sensing the signal in the integrating means and for forming a converted signal representative of the signal being converted.

6. A signal converter for converting electronic signals comprising a magnetic core for storing flux corresponding to signals to be converted and having at least one reference level of flux, a source of timing signals, first means arranged for magnetically driving the flux stored in the core toward said reference level in response to timing signals a plurality of times for each signal converted, and second means arranged for selectively and magnetically driving the flux stored in the core away from said reference level intermediate the driving by said first means and in response to said reference level, the operation of said first and second means thereby causing the level of signal in said core to define a triangular pattern with time for each signal converted.

7. A signal converter for converting electronic signals comprising a magnetic core for storing flux corresponding to signals to be converted and having at least one reference level of flux, means for initially coupling and uncoupling an input signal to said core at the beginning of the conversion of such signal for storing a signal to be converted, first winding means magnetically coupled to said core, first means including switching means arranged for applying a signal to said winding means for magnetically driving the flux stored in said core towards said reference level a plurality of times for each signal converted, second winding means magnetically coupled to said core, and second means including switching means arranged for selectively applying a signal through said winding means intermediate the signal applied by said first switching means for magnetically driving the flux stored in said core away from said reference level, the operation of said first and second means thereby causing the level of signal in said core to define a triangular pattern with time for each signal converted.

8. A signal converter for converting electronic signals comprising a magnetic core for storing flux corresponding to signals to be converted and having at least one reference level of flux, means for initially coupling and uncoupling an input signal to said core at the beginning of the conversion of such signal for storing a signal to be converted, first winding means magnetically coupled to said core, first means including switching means arranged for applying a signal to said winding means for magnetically driving the flux stored in said core towards said reference level a plurality of times for each signal converted, second winding means magnetically coupled to said core, second means including switching means arranged for selectively applying a signal through said winding means intermediate the signal applied by said first switching means for magnetically driving the flux stored in said core away from said reference level, the operation of said first and second means thereby causing the level of flux in said core to define a triangular pattern with time for each signal converted and means for sensing the flux in the core at preselected time intervals and for forming a converted signal representative of the signal being converted as represented by the flux in said core.

9. A signal converter for converting electronic signals comprising a magnetic core for storing a value of flux corresponding to signals to be converted and having at least one stable reference level of flux, means for coupling and uncoupling an input signal to said core at the beginning of the conversion of such signal for storing a signal to be converted, first means arranged for magnetically driving the flux stored in said core toward said reference level a plurality of times for each signal converted, second means arranged in response to the reference level of said core for magnetically driving the flux stored in said core away from said reference level intermediate the driving by said first means, the operation of said first and second means thereby causing the flux in said core to define a triangular pattern with time for each signal converted, and means for sensing the signal in the core and for forming a converted signal representative of the signal being converted.

10. An analog-to-digital converter comprising a source of analog signals, a magnetic core having at least one stable magnetic state, read-in means arranged to become operative and then inoperative at the beginning of a conversion for causing a magnetic condition in the core with respect to the stable state representative of one of said analog signals, additive circuit means including winding means magnetically coupled to the core for driving the magnetic condition thereof toward the stable state, subtractive circuit means including winding means coupled to the magnetic core for driving the magnetic condition thereof away from the stable state, timing control circuit means for repeatedly energizing the subtractive circuit means when said read-in means is inoperative for driving the magnetic condition of the core toward the reference state and for energizing the additive circuit means intermediate the energizing of the subtractive circuit means for causing increasing and decreasing magnetic conditions in the core, and circuit means for sensing the magnetic condition of the core at predetermined time intervals and arranged for forming coded digital signals representative of said analog signal.

11. An analog-to-digital converter comprising a source of analog signals, a magnetic core having at least one stable magnetic state, read-in means arranged for becoming operative and then inoperative at the beginning of a conversion for causing a magnetic condition in the core with respect to the stable state representative of one of said analog signals, additive circuit means including winding means magnetically coupled to the core for driving the magnetic condition thereof toward the stable state, subtractive circuit means including winding means coupled to the magnetic core for driving the magnetic condition thereof away from the stable state, timing control circuit means for energizing the subtractive circuit means when said read-in means is inoperative for driving the magnetic condition of the core toward the reference state and for energizing the additive circuit means conditioned on the magnetic condition reaching the stable state, the additive and subtractive circuit means thereby causing increasing and decreasing magnetic conditions in the core, and circuit means for detecting the magnetic condition of the core at certain time intervals and arranged for forming a coded signal representative of a single digit of a digital signal representative of the analog signal.

12. An analog-to-digital converter comprising a source of analog signals, a magnetic core having at least one stable magnetic state, read-in means arranged for becoming operative and then inoperative at the beginning of a conversion for causing a magnetic condition in the core with respect to the stable state representative of one of said analog signals, additive circuit means including winding means magnetically coupled to the core for driving the magnetic condition thereof toward the stable state, subtractive circuit means including winding means coupled to the magnetic core for driving the magnetic condition thereof away from the stable state, timing control circuit means for energizing the subtractive circuit means at the turn off of said read-in means for driving the magnetic condition thereof toward the reference state and for energizing the additive circuit means conditioned on the magnetic condition reaching the stable state, the additive and subtractive circuit means thereby causing increasing and decreasing magnetic conditions in the core, and circuit means for detecting the direction of change in magnetic condition of the core at the end of said time interval and arranged for forming a coded signal representative of a single digit of a digital signal representative of the analog signal in response to a predetermined change in magnetic condition.

13. An analog-to-digital converter comprising a magnetic core having at least a single stable state and normally arranged therein, a source of analog signals, means for periodically coupling and uncoupling said source to said winding means at the beginning of each conversion for energizing said winding means and set a value of magnetic flux in said core proportional to the analog signal, winding means coupled to said core, control means coupled to the winding means for increasing and decreasing in magnetic flux in the core thereby defining a preselected pattern with time indicative of the analog signal, and circuit means coupled to said core for sensing and responding to the direction of change in flux at predetermined time intervals to provide coded output signals representative of the direction of changes in flux which output signals are indicative of the analog signals.

14. A direct read-out analog-to-digital converter comprising a source of analog signals, a magnetic core having at least one stable reference state and normally arranged therein, first winding means coupled to said core, means for coupling and uncoupling said analog signals to said first winding means at the beginning of a conversion cycle for causing a magnetic condition thereof proportional to an analog signal, means comprising second winding means coupled to said core for driving the magnetic condition thereof toward said reference state, means comprising third winding means coupled to said core for driving the magnetic condition thereof away from said reference state in response to said reference state, said second and third means thereby defining a preselected pattern with time corresponding to the analog signal stored in the core and circuit means magnetically coupled to said core for sensing the direction of change in the magnetic condition of said core at preselected time intervals and for providing coded output signals indicative of the analog signals.

15. A direct read-out analog-to-digital converter comprising a source of analog signals, a magnetic core having at least one stable reference state and normally arranged in same, means for coupling and uncoupling said analog signals to said core at the beginning of a conversion cycle for thereby causing a change in magnetic condition thereof proportional to the analog signal to be converted relative to said reference state, means for repeatedly driving the magnetic condition of the core toward said reference state commencing at the beginning of predetermined time intervals, means for driving the magnetic condition of the core away from said reference state during each of such time intervals, said latter pair of means being operative for causing a preselected pattern of the magnetic flux in the core with time, and circuit means magnetically coupled to said core for responding to the magnetic condition in said core during each of said time intervals for providing coded output signals.

16. An analog-to-digital converter comprising a source of analog signals, a magnetic core having a substantially rectangular hysteresis characteristic and normally arranged in a reference state, read-in means for magnetically coupling and uncoupling one of said analog signals to said core at the beginning of the conversion of such signal for causing a change in magnetic condition with respect to said reference state proportional to the analog signal, subtractive circuit means magnetically coupled to said core for driving the magnetic condition thereof toward said reference state, additive circuit means coupled to said magnetic core for driving the magnetic condition thereof away from said reference state, timing control circuit means for repeatedly energizing said subtractive circuit means for driving the magnetic condition thereof to the reference state and for selectively energizing said additive circuit means intermediate the energizing of said subtractive circuit means for causing increasing and decreasing magnetic conditions in the core and circuit means for sensing the direction of change in the magnetic condition of said core at predetermined time intervals and arranged in response thereto for forming coded digital signals representative of the analog signal read into said core.

17. An analog-to-digital converter comprising a source of analog signals, a magnetic core having a substantially rectangular hysteresis characteristic and normally arranged in a reference state, read-in winding means coupled to said core, first switching circuit means coupled to said read-in winding means, control means coupled to said first switching means and arranged for causing same to couple the analog signals to the read-in winding means for a predetermined time interval and then uncouple same at the beginning of the conversion of such signal for storing a magnetic condition in the core relative to said reference state which is proportional to the analog signal, subtractive winding means coupled to said magnetic core, second switching circuit means arranged for applying a signal to the subtractive winding means for causing the magnetic core to be driven toward said reference state, additive winding means coupled to said magnetic core, third switching circuit means arranged for applying a signal to said additive winding means for causing the magnetic core to be driven away from said reference state, and timing control circuit means for energizing said first switching means for reading an analog signal into said core by means of said read-in winding means, said control circuit means additionally being arranged for energizing said second switching means at the uncoupling of said analog signal for driving the magnetic core towards the reference state and for selectively energizing said third switching circuit means for driving the core away from said reference state in response to the reference condition of said core, and circuit means responsive to a prearranged conductive condition of said second switching means at preselected time intervals for forming binary coded signals representative of the analog signal read into said core.

18. A signal converter for converting an analog signal into a digital signal of a predetermined radix comprising a signal integrating means, means arranged to become operative and inoperative at the beginning of a conversion for storing an analog signal to be converted in said integrating means, first means for driving the signal stored in said integrating means at a first rate toward a reference level, second means responsive to said reference level for driving the signal in said integrating means away from said reference level at said first rate, and third means selectively operative in response to said reference level for driving the signal in said integrating means away from said reference level at a second rate equal to the product of the radix of digital signal being converted into times said first rate.

References Cited by the Examiner

UNITED STATES PATENTS

| | | | |
|---|---|---|---|
| 2,739,285 | 3/1956 | Windsor | 340—347 |
| 2,947,971 | 8/1960 | Glauberman et al. | 340—347 |
| 3,079,598 | 2/1963 | Wald | 340—347 |
| 3,098,224 | 7/1963 | Hoffman | 340—347 |

DARYL W. COOK, *Acting Primary Examiner.*

MALCOLM A. MORRISON, *Examiner.*

L. W. MASSEY, K. R. STEVENS, *Assistant Examiners.*

UNITED STATES PATENT OFFICE

CERTIFICATE OF CORRECTION

Patent No. 3,264,636 August 2, 1966

Cecil H. Coker

It is hereby certified that error appears in the above numbered patent requiring correction and that the said Letters Patent should read as corrected below.

Column 7, line 20, for "(and $\Delta\phi_1$)" read -- (and $\Delta\phi_1'$) --; column 9, line 27, for "coder" read -- coded --; column 10, line 45, for "postive" read -- positive --; column 11, line 27, for "pluses connecter" read -- pulses connected --; line 55, for "copacitor" read -- capacitor --; column 15, line 48, for "56" read -- 56c --; column 19, line 29, for "system" read -- systems --; line 44, for "whereby" read -- thereby --.

Signed and sealed this 22nd day of August 1967.

(SEAL)
Attest:

ERNEST W. SWIDER
Attesting Officer

EDWARD J. BRENNER
Commissioner of Patents